United States Patent
Ye

(10) Patent No.: US 10,782,832 B2
(45) Date of Patent: Sep. 22, 2020

(54) MOBILE TERMINAL AND TOUCH SCREEN WITH A NOTCH AREA

(71) Applicant: Wuhan China Star Optoelectronics Semiconductor Display Technology Co., Ltd., Wuhan, Hubei (CN)

(72) Inventor: Jian Ye, Hubei (CN)

(73) Assignee: WUHAN CHINA STAR OPTOELECTRONICS SEMICONDUCTOR DISPLAY TECHNOLOGY CO., LTD., Wuhan, Hubei (CN)

(*) Notice: Subject to any disclaimer, the term of this patent is extended or adjusted under 35 U.S.C. 154(b) by 0 days.

(21) Appl. No.: 16/233,011

(22) Filed: Dec. 26, 2018

(65) Prior Publication Data

US 2020/0012364 A1 Jan. 9, 2020

Related U.S. Application Data

(63) Continuation of application No. PCT/CN2018/104468, filed on Sep. 7, 2018.

(30) Foreign Application Priority Data

Jul. 9, 2018 (CN) .......................... 2018 1 0742333

(51) Int. Cl.
*G06F 3/044* (2006.01)
*H04M 1/02* (2006.01)
*G06F 1/16* (2006.01)

(52) U.S. Cl.
CPC ............ *G06F 3/044* (2013.01); *G06F 1/1637* (2013.01); *H04M 1/0266* (2013.01); *G06F 2203/04111* (2013.01)

(58) Field of Classification Search
CPC .......... G06F 1/1613–1698; G06F 2203/04111
See application file for complete search history.

(56) References Cited

U.S. PATENT DOCUMENTS

| | | | |
|---|---|---|---|
| 8,816,967 B2* | 8/2014 | Lyon | G06F 3/044 345/173 |
| 2010/0073319 A1* | 3/2010 | Lyon | G06F 3/044 345/174 |

(Continued)

FOREIGN PATENT DOCUMENTS

| CN | 101815956 A | 8/2010 |
|---|---|---|
| CN | 107340942 A | 11/2017 |
| CN | 108132732 A | 6/2018 |

*Primary Examiner* — Gene W Lee
(74) *Attorney, Agent, or Firm* — Leong C. Lei

(57) ABSTRACT

Disclosed is a touch screen, comprising a touch area, provided with a plurality of first conductive lines extending along a first direction and a plurality of second conductive lines extending along a second direction, and the second conductive line is insulated from and overlapped with the first conductive line, and each of the first conductive lines comprises a plurality of first sensing electrodes arranged at intervals and connecting strips, and each of the second conductive lines comprises a plurality of second sensing electrodes arranged at intervals and connecting bridges; a U-shaped notch area is disposed in the touch area, and the U-shaped notch area intercepts at least one first conductive line or/and at least one second conductive line; the first conductive line intercepted by and located at two sides of the U-shaped notch area is connected electrically to achieve connection to the bonding area of the touch screen.

14 Claims, 7 Drawing Sheets

(56) References Cited

U.S. PATENT DOCUMENTS

| | | | |
|---|---|---|---|
| 2019/0155428 A1* | 5/2019 | Lee | G06F 3/0416 |
| 2019/0204982 A1* | 7/2019 | Peng | G06F 3/0416 |
| 2019/0214595 A1* | 7/2019 | Park | G06F 3/0443 |
| 2019/0214596 A1* | 7/2019 | Park | H01L 27/3276 |
| 2019/0302942 A1* | 10/2019 | Kim | G06F 3/047 |
| 2019/0346943 A1* | 11/2019 | Kim | G06F 3/0446 |
| 2019/0369787 A1* | 12/2019 | Park | G06F 3/044 |
| 2020/0004362 A1* | 1/2020 | Yang | G06F 3/04886 |
| 2020/0012387 A1* | 1/2020 | Kim | H01L 27/3276 |

* cited by examiner

MOBILE TERMINAL AND TOUCH SCREEN WITH A NOTCH AREA

CROSS-REFERENCE TO RELATED APPLICATION

This application is a continuing application of PCT Patent Application No. PCT/CN2018/104468 entitled "Touch screen and mobile terminal", filed on Sep. 7, 2018, which claims priority to Chinese Patent Application No. 201810742333.X, filed on Jul. 9, 2018, both of which are hereby incorporated in its entireties by reference.

FIELD OF THE INVENTION

The present invention relates to a display technology field, and more particularly to a touch screen and a mobile terminal.

BACKGROUND OF THE INVENTION

The touch screen possesses many advantages, such as fast response speed, accurate positioning; multi-touch support, long service life, etc.; and is widely used in mobile terminals. In order to make the user more comfortable, the size of the substrate of the touch screen is increased and the resolution is further improved. As shown in FIG. 1, a structural diagram of a conventional touch screen is shown. In FIG. 1, the touch screen 1' includes a touch area 10'. The touch area 10' has a routing area 15' on both sides, a bonding area 13' on the lower side for routing, and a U-shaped notch 14' is disposed on the upper side thereof, which can be used to set a camera, a headphone hole and an infrared sensing hole. In such conventional touch screen 1', the upper side where the U-shaped notch area 14' is located is not provided with a touch function.

With the development, the design of the full screen is becoming more and more popular. It is expected that the touch operation can be performed around the U-shaped notch area. For instance, it is desirable to perform display or touch operation in the upper area of the camera; however, with the existence of the U-shaped notch structure, the complete horizontal or vertical touch electrode channel pattern at this position will be intercepted, so that the pattern of the remaining sensing electrodes is incomplete and cannot be connected to the bonding area, thereby making the touch function impossible.

SUMMARY OF THE INVENTION

An objective of the present invention is to provide a touch screen and a mobile terminal, which can implement a touch function around a U-shaped notch area of the touch screen.

For solving the aforesaid issue, the embodiment of the present invention provides a touch screen.

The touch screen includes a touch area. The touch area is provided with a plurality of first conductive lines extending along a first direction and a plurality of second conductive lines extending along a second direction, and the second conductive line is insulated from and overlapped with the first conductive line, and each of the first conductive lines comprises a plurality of first sensing electrodes arranged at intervals and a connecting strip connecting two adjacent first sensing electrodes, and each of the second conductive lines comprises a plurality of second sensing electrodes arranged at intervals and a connecting bridge connecting two adjacent second sensing electrodes in a cross-bridge manner, wherein each of the first conductive lines and each of the second conductive lines extend to a bonding area of the touch screen through first type traces;

a U-shaped notch area is disposed in the touch area, and the U-shaped notch area intercepts at least one first conductive line or/and at least one second conductive line;

the first conductive line intercepted by and located at two sides of the U-shaped notch area is connected electrically to achieve connection to the bonding area of the touch screen.

Each of the first conductive lines intercepted by the U-shaped notch area is connected by a connecting line, and the connecting line is disposed along an edge of the U-shaped notch area;

wherein a first end of the connecting line is connected to a first sensing electrode on one side of the U-shaped notch area, and a second end of the connecting line is connected to a first sensing electrode in a same extending direction on an other side of the U-shaped notch area.

A portion of the first conductive line intercepted by the U-shaped notch area is connected to the bonding region by at least one second type trace; and one end of each second type trace is connected to an outermost first sensing electrode of the intercepted portion of the first conductive line, and an other end of each second type trace extends to the bonding area.

An area of a remaining second sensing electrode of the second conductive line intercepted by the U-shaped notch area is greater than or equal to half of an area of a complete second sensing electrode, the remaining second sensing electrode is connected to the complete second sensing electrode in a same extending direction by the connecting bridge; or wherein when the area of the remaining second sensing electrode of the second conductive line intercepted by the U-shaped notch area is smaller than half of the area of the complete second sensing electrode, the remaining second sensing electrode is used as a dummy sensing electrode and disconnected from the complete second sensing electrode in the same extending direction.

The first sensing electrode and the second sensing electrode are offset from each other in a top view, and the connecting strip and the connecting bridge overlap each other.

The first sensing electrode and the second sensing electrode are in a rhombus shape, and a side of the first sensing electrode and a side of the second sensing electrode are parallel to each other.

The touch screen further includes an insulating layer. The insulating layer is disposed between the connecting strip and the connecting bridge; the connecting line for connecting the first conductive line is electrically insulated from the second sensing electrode, and connecting line for connecting the second conductive line is electrically insulated from the first sensing electrode.

The first sensing electrode is one of a transmitting electrode and a receiving electrode, and the second sensing electrode is another one of the transmitting electrode and the receiving electrode.

Correspondingly, the present invention further provides a mobile terminal. The mobile terminal includes the aforesaid touch screen.

With implementing the embodiments of the present invention, the benefits are:

In the touch screen and the mobile terminal provided by the present invention, the touch pattern is disposed around the U-shaped notch area formed in the touch area, and the intercepted horizontal or vertical channels are connected by the connecting line, or the sensing electrode intercepted by the U-shaped notch area is connected to the bonding area by the second type traces, so that the complete touch channels can be formed, and the continuity and integrity of the touch channel are maintained; therefore, the touch performance around the U-shaped notch area can be realized, and the meaningful full-screen touch can be realized.

BRIEF DESCRIPTION OF THE DRAWINGS

In order to more clearly illustrate the embodiments of the present invention or the prior art, the following figures will be described in the embodiments or the prior art are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Figure 1:
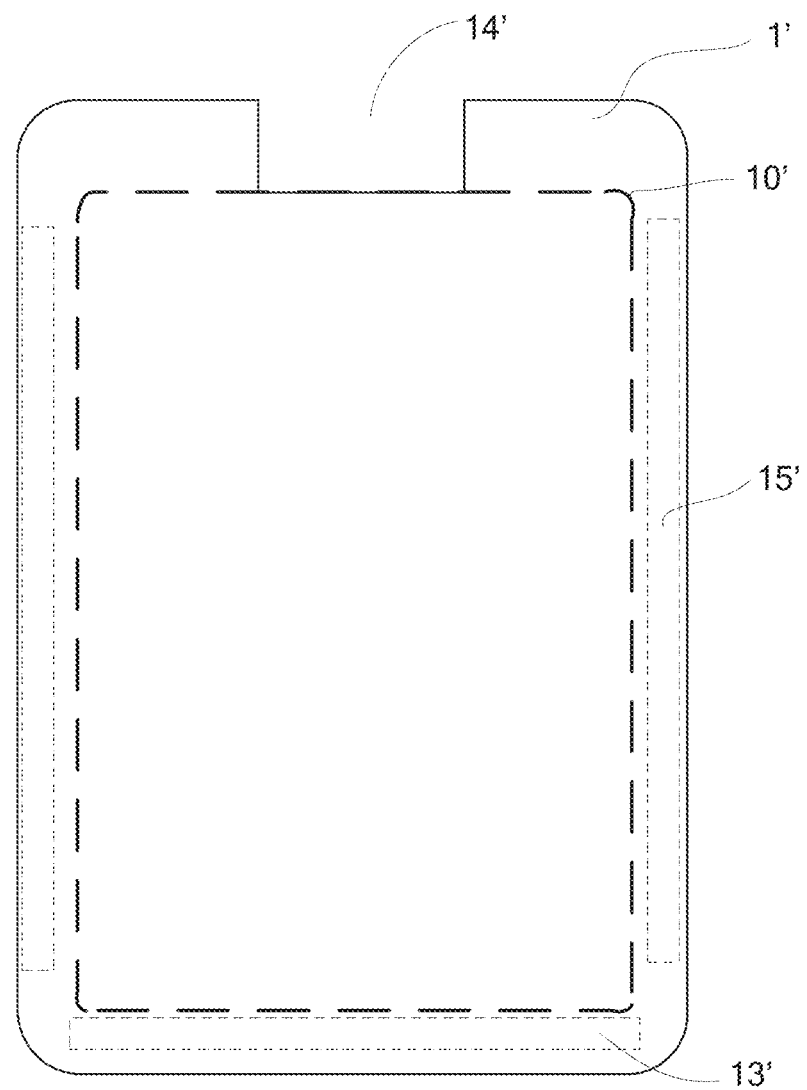
FIG. 1 is a structural diagram of a touch screen according to the prior art.

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Here, it should also be noted that, in order to avoid obscuring the present invention due to unnecessary details, only the structures and/or processing steps closely related to the solution according to the present invention are shown in the drawings, and other details that are not relevant to the present invention are omitted.

Figure 2:
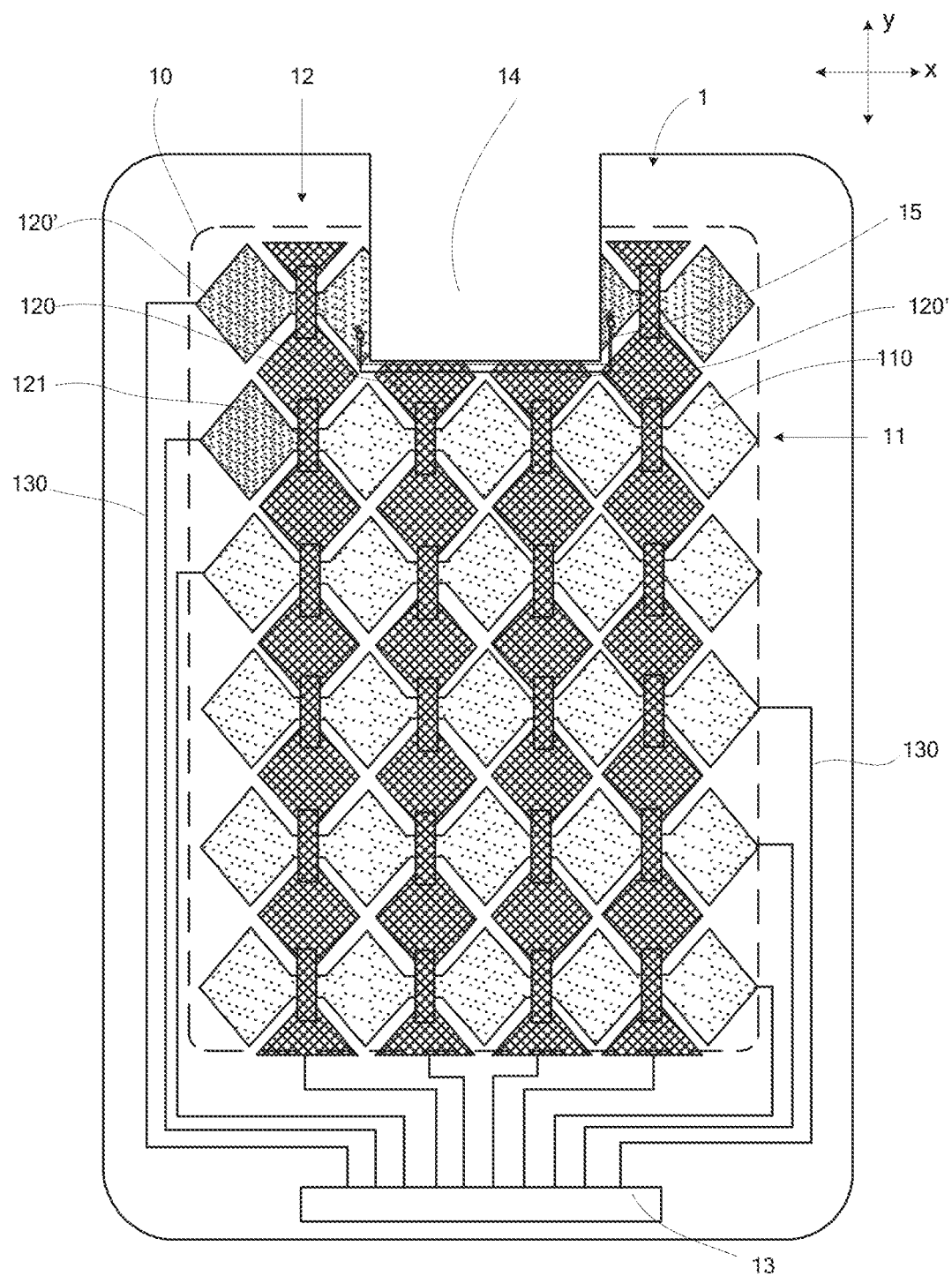
FIG. 2 is a structural diagram of the first embodiment of a touch screen provided by the present invention.
Figure 3:
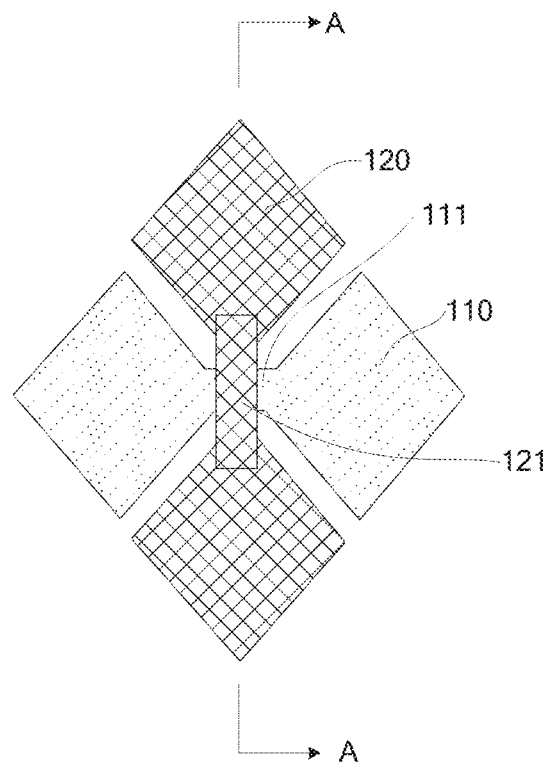
FIG. 3 is a structural diagram of a touch unit in FIG. 2.
Figure 4:
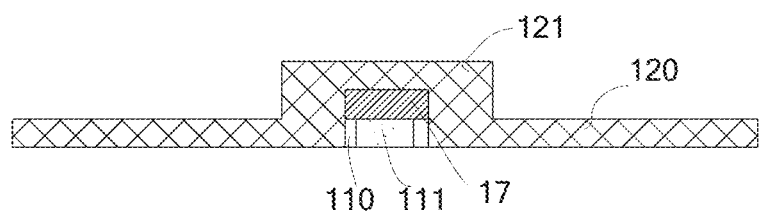
FIG. 4 is a cross-sectional diagram along line A-A in FIG. 2.

Please refer to FIG. 2, which illustrates a structural diagram of the first embodiment according to a touch screen provided by the present invention with FIG. 3 and FIG. 4, together. In this embodiment, the touch screen 1 includes a touch area 10. The touch area 10 is provided with a plurality of first conductive lines 11 extending along a first direction (the X-direction) and a plurality of second conductive lines 12 extending along a second direction (the Y-direction), and the second conductive line 12 is insulated from and overlapped with the first conductive line 11, and each of the first conductive lines 11 comprises a plurality of first sensing electrodes 110 arranged at intervals and a connecting strip 111 connecting two adjacent first sensing electrodes 110, and each of the second conductive lines 12 comprises a plurality of second sensing electrodes 120 arranged at intervals and a connecting bridge 121 connecting two adjacent second sensing electrodes 120 in a cross-bridge manner, wherein each of the first conductive lines 11 and each of the second conductive lines 12 extend to a bonding area 13 of the touch screen through first type traces 130; it can be understood that, the amounts of the first conductive lines 11 and the second conductive lines 12 in FIG. 2 are merely illustrative but not limited thereto.

The first sensing electrode 110 and the second sensing electrode 120 are offset from each other in a top view, and the connecting strip 111 and the connecting bridge 121 overlap each other. In can be understood that the touch screen further includes an insulating layer 17. The insulating layer 17 is disposed between the connecting strip 111 and the connecting bridge 121 to achieve the insulation between the connecting strip 111 and the connecting bridge 121; the specific structure can be referred to FIG. 3 and FIG. 4.

The touch screen 1 in this embodiment is square, the portion of the first sensing electrode 110 and the second sensing electrode 120 on the side of the square touch screen 1 are triangular, and the others are in a rhombus shape. The first sensing electrode 110 and the second sensing electrode 120 are offset from each other in a top view, and a side of the first sensing electrode 110 and a side of the second sensing electrode 120 are parallel to each other.

A U-shaped notch area 14 is disposed in the touch area, and the U-shaped notch area 14 intercepts at least one first conductive line 11 or/and at least one second conductive line 12, and the figure shows that one first conductive line 11 and two second conductive lines 12 are intercepted;

in this embodiment, the first conductive line 11 intercepted by and located at two sides of the U-shaped notch area 14 is connected electrically to achieve connection to the bonding area 13 of the touch screen 1, and specifically, in this embodiment, each of the first conductive lines 11 intercepted by the U-shaped notch area 14 is connected by a connecting line 15, and the connecting line 15 is disposed along an edge of the U-shaped notch area 14, wherein the dots in the figure are connecting areas;

wherein a first end of each connecting line 15 is connected to a first sensing electrode 110 on one side of the U-shaped notch area 14, and a second end of the connecting line is connected to a first sensing electrode 110 in a same extending direction on the other side of the U-shaped notch area 14, as indicated as the horizontal connecting line 15 in FIG. 2.

It can be understood that during the routing of the connecting line 15, it is necessary to ensure the insulation from other sensing electrodes. Specifically, the connecting line 15 (such as the horizontal connecting line) for connecting the first conductive line 11 is electrically insulated from the second sensing electrode 12, such as with an insulating layer. The connecting line 15 (such as the vertical connecting line) for connecting the second conductive line 12 is electrically insulated from the first sensing electrode 110, such as with an insulating layer; the insulating layers can be disposed in the same layer as the aforesaid insulating layer 17.

In this embodiment, an area of a remaining second sensing electrode 120' of each second conductive line 12 intercepted by the U-shaped notch area 14 is greater than or equal to half of an area of a complete second sensing electrode 120, the remaining second sensing electrode is connected to the complete second sensing electrode 120 in the same extending direction by the connecting bridge 121.

The first sensing electrode 110, the connecting strip 111, the second sensing electrode 120, the connecting bridge 121 and the connecting line 15 may be made of the same material, such as a transparent conductive material, an ITO (conductive glass) material and etc. . . . . . For the production process of the touch screen 1, there is no limitation here, and different process flows can be adopted according to practical conditions. For instance; when the connecting line 15 and the first sensing electrode 110 are both made of the same material, the first sensing electrode 110, the second sensing electrode 120 and the connecting strip 111 may be first formed in the same mask process, and then the connecting bridge 121 and the connecting line 15 are prepared. In the same mask process, the first sensing electrode 110, the second sensing electrode 120 and the connecting bridge 121 having large areas can make full utilization of materials and can reduce costs.

The first sensing electrode 110 is one of a transmitting electrode and a receiving electrode, and the second sensing electrode 120 is another one of the transmitting electrode and the receiving electrode; specifically, in one embodiment, the first sensing electrode 110 is a transmitting electrode, and the second sensing electrode 120 is a receiving electrode; and in another embodiment, the first sensing electrode 110 may be a receiving electrode and the second sensing electrode 120 may be a transmitting electrode. The transmitting electrode is used for inputting a driving signal, and the receiving electrode is for receiving a detecting signal. As performing touch detection, a mutual capacitance change at the intersection of the two conductive lines or a self-capacitance change of each conductive line are detected; that is, a self-capacitance or a mutual capacitance are employed to get a location of the touch point. If the coordinate system is established in the first direction X and the second direction Y, the obtained touch point position can be represented by the coordinate system. Generally, the first direction X and the second direction Y are generally defined as being perpendicular to each other. In order to make capacitance detection easier, a coordinate positioning is also more convenient. When the touch screen 1 is in another form (circular, irregular shape; or curved shape), the first direction X and the second direction Y may also be set to be non-perpendicularly intersected.

Figure 5:
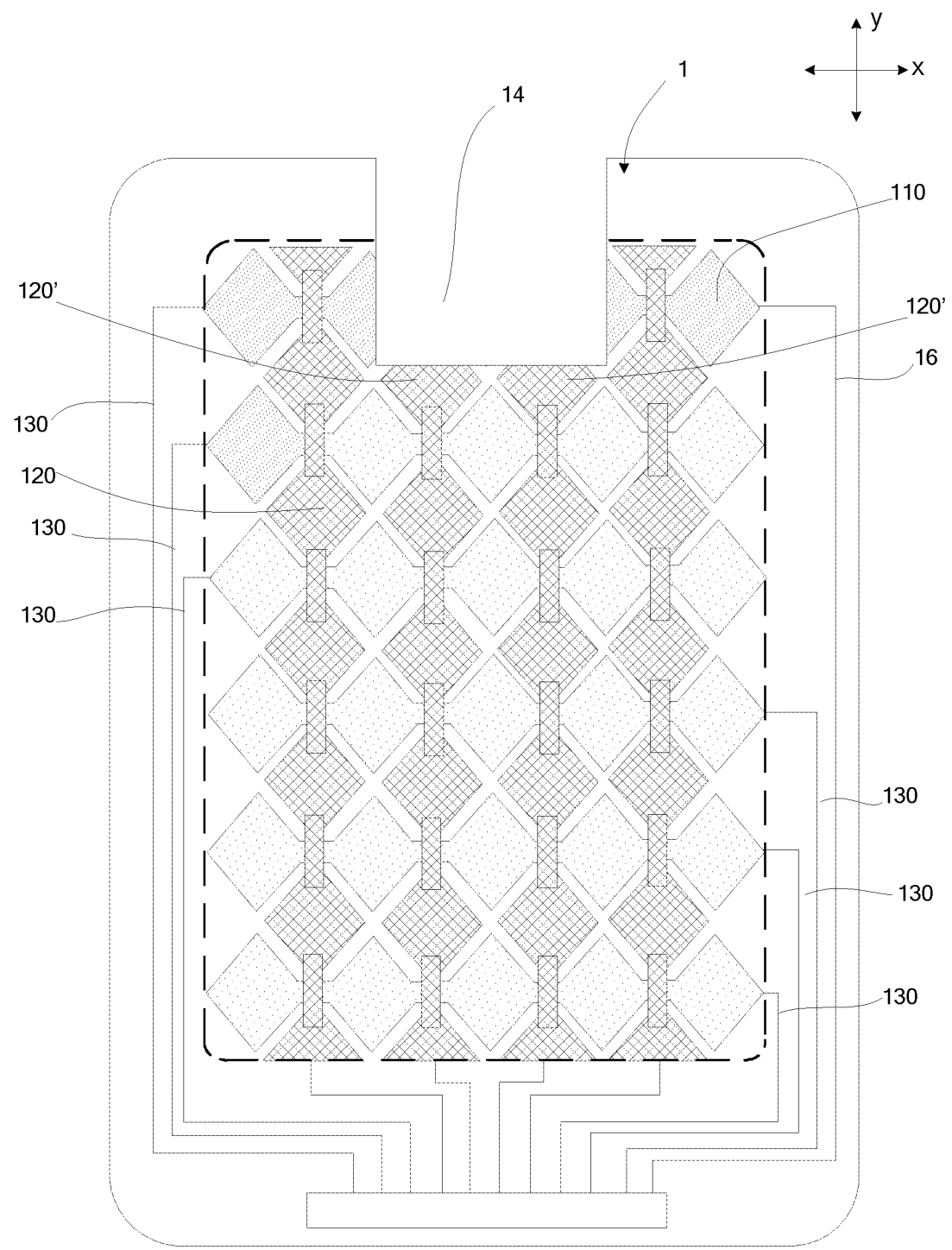
FIG. 5 is a structural diagram of the second embodiment of a touch screen provided by the present invention.

As shown in FIG. 5, which shows a structural diagram of the second embodiment of a touch screen provided by the present invention; in this embodiment, the difference from the first embodiment shown in FIG. 2 is: a portion (as shown in the right side of the first row in FIG. 5) of the first conductive line 11 intercepted by the U-shaped notch area 14 is connected to the bonding region 13 by at least one second type trace 16; one end of each second type trace 16 is connected to an outermost first sensing electrode 110 of the intercepted portion of the first conductive line (i.e. the outermost first sensing electrode 110 on the right side of the U-shaped notch area in FIG. 5), and the other end of each second type trace extends to the bonding area 13.

Figure 6:
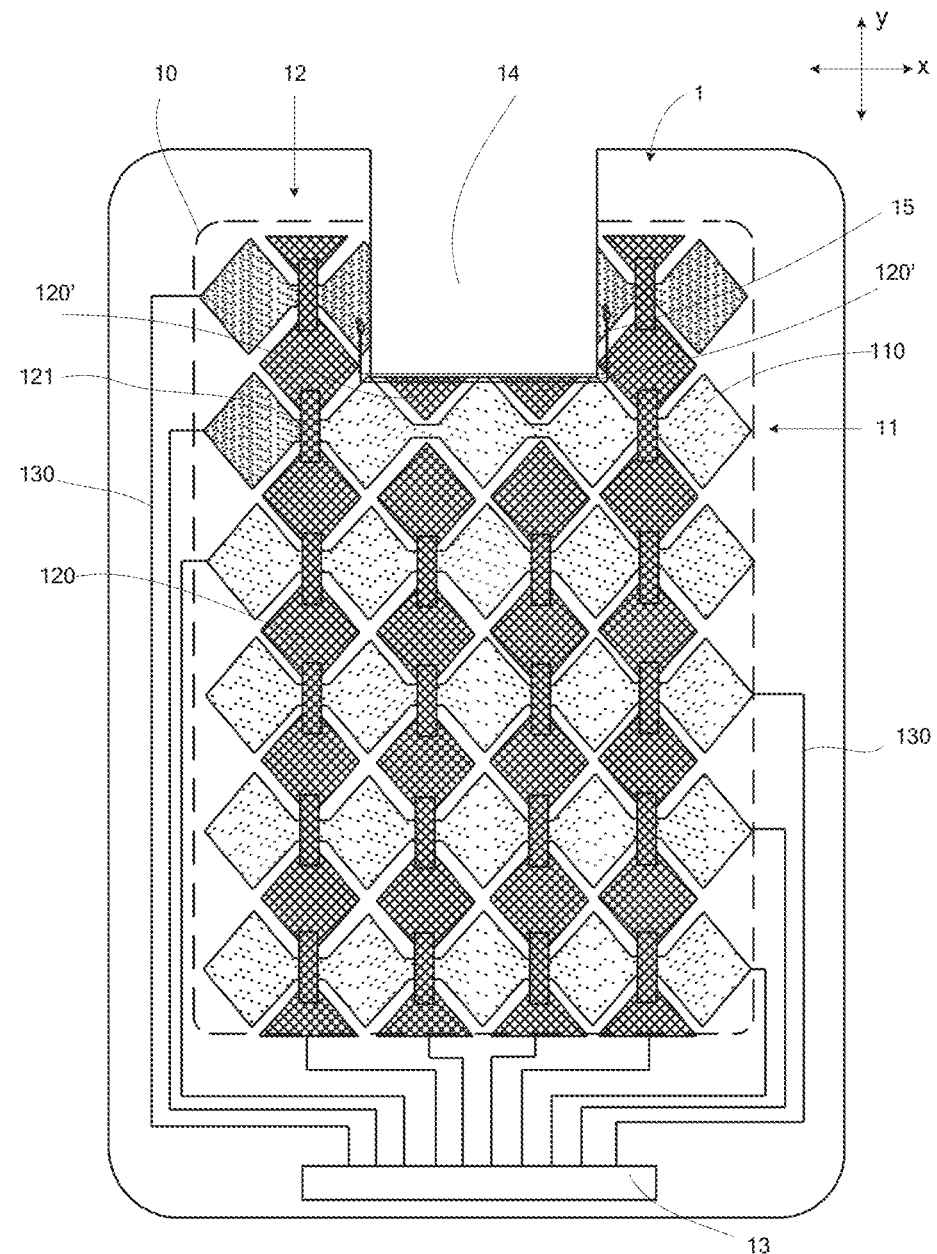
FIG. 6 is a structural diagram of the third embodiment of a touch screen provided by the present invention.

As shown in FIG. 6, which shows a structural diagram of the third embodiment of a touch screen provided by the present invention; in this embodiment, the difference from the first embodiment shown in FIG. 2 is: the area of the remaining second sensing electrode 120' of the second conductive line 12 intercepted by the U-shaped notch area 14 is smaller than half of the area of the complete second sensing electrode 120, then the remaining second sensing electrode 120' is used as a dummy sensing electrode and disconnected from the complete second sensing electrode 120 in the same extending direction. Specifically, the disposition of the connecting bridge is not required. In this case, when a finger touches here, it can be determined as a nearby coordinate position by an algorithm. In case of length/width<1 mm, the touch IC (Touch IC) generally can recognize the accuracy range of 2.5 mm to 4 mm, so it does not affect the touch position determination.

For further details of this embodiment, reference may be made to the foregoing description of FIG. 2, and details are not described herein.

Figure 7:
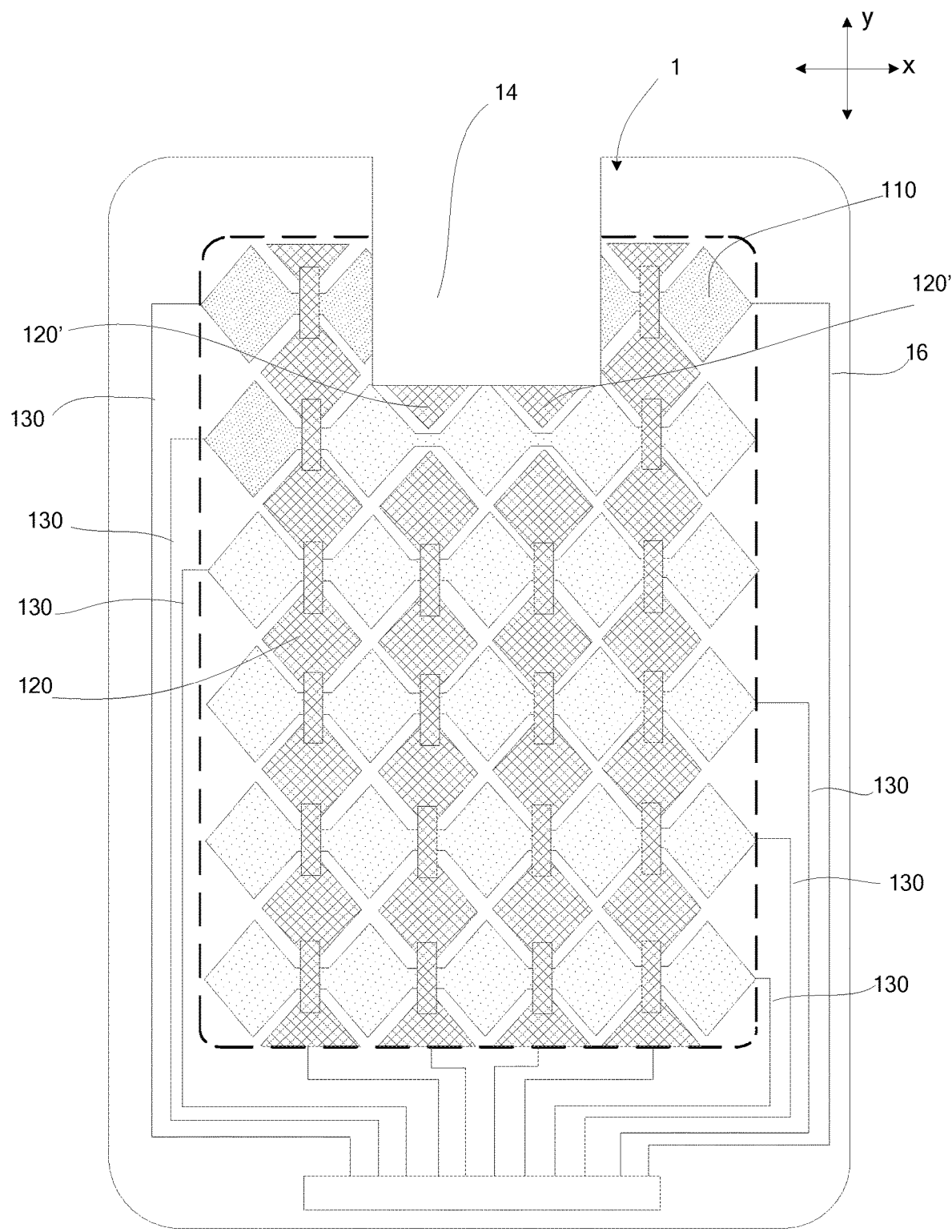
FIG. 7 is a structural diagram of the fourth embodiment of a touch screen provided by the present invention.

As shown in FIG. 7, which shows a structural diagram of the fourth embodiment of a touch screen provided by the present invention; in this embodiment, the difference from the second embodiment shown in FIG. 5 is: the area of the remaining second sensing electrode 120' of the second conductive line 12 intercepted by the U-shaped notch area 14 is smaller than half of the area of the complete second sensing electrode 120, then the remaining second sensing electrode 120' is used as a dummy sensing electrode and disconnected from the complete second sensing electrode 120 in the same extending direction. Specifically, the disposition of the connecting bridge is not required.

For further details of this embodiment, reference may be made to the foregoing description of FIG. 5, and details are not described herein.

Figure 8:
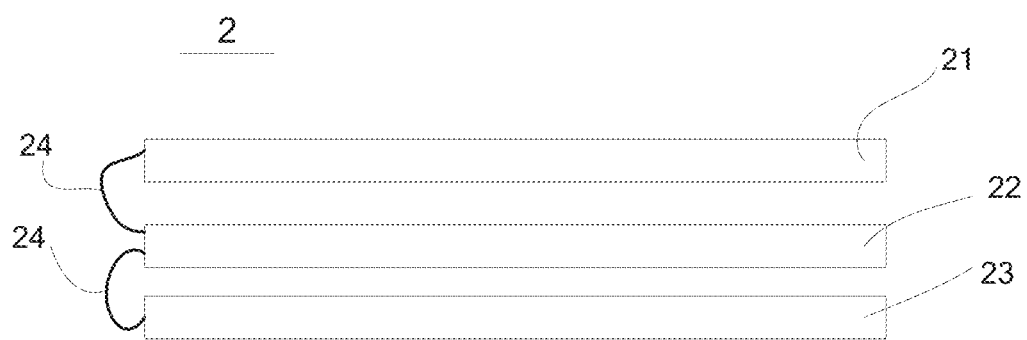
FIG. 8 is a structural diagram of the first embodiment of a mobile terminal provided by the present invention.

FIG. 8 shows a structural diagram of the first embodiment of a mobile terminal provided by the present invention. This embodiment provides a mobile terminal 2 including a touch screen 21, a display panel 22 and a main board 23.

The touch screen 21 has the same structure and function as the touch screen 1 shown in FIG. 2, FIG. 5, FIG. 6 or FIG. 7. The display panel 22 is a TFT-LCD (Thin Film Transistor Liquid Crystal Display) or an AMOLED (Active Matrix Organic Light Emitting Diode). The main board 23 is used for implementing control and calculation functions. The three components are connected by a FPC flexible cable 24.

With implementing the embodiments of the present invention, the benefits are:

In the touch screen and the mobile terminal provided by the present invention, the touch pattern is disposed around the U-shaped notch area formed in the touch area, and the intercepted horizontal or vertical channels are connected by the connecting line, or the sensing electrode intercepted by the U-shaped notch area is connected to the bonding area by the second type traces, so that the complete touch channels can be formed, and the continuity and integrity of the touch channel are maintained: therefore, the touch performance around the U-shaped notch area can be realized, and the meaningful full-screen touch can be realized.

Incidentally, herein, relational terms such as first and second and the like are only used to distinguish one entity or operation from another entity or operation separate, without necessarily requiring or implying these entities or operations of between the presence of any such actual relationship or order. Further, the term "comprising", "containing" or any other variation thereof are intended to cover a non-exclusive inclusion, such that a process, method, article, article, or apparatus not include only those elements but not expressly listed further comprising the other elements, or further comprising such process, method, article, or apparatus inherent elements. Without more constraints, by the wording "include a" defined does not exclude the existence of additional identical elements in the element comprising a process, method, article, or apparatus.

Above are only specific embodiments of the present application, the scope of the present application is not limited to this, and to any persons who are skilled in the art, change or replacement which is easily derived should be covered by the protected scope of the application. Thus, the protected scope of the application should go by the subject claims.

What is claimed is:

1. A touch screen, comprising a touch area, wherein the touch area is provided with a plurality of first conductive lines extending along a first direction and a plurality of second conductive lines extending along a second direction, and the second conductive line is insulated from and overlapped with the first conductive line, and each of the first conductive lines comprises a plurality of first sensing electrodes arranged at intervals and a connecting strip connecting two adjacent first sensing electrodes, and each of the second conductive lines comprises a plurality of second sensing electrodes arranged at intervals and a connecting bridge connecting two adjacent second sensing electrodes in a cross-bridge manner, wherein each of the first conductive lines and each of the second conductive lines extend to a bonding area of the touch screen through first type traces;
   a U-shaped notch area is disposed in the touch area, and the U-shaped notch area intercepts at least one first conductive line or/and at least one second conductive line;
   the first conductive line intercepted by and located at two sides of the U-shaped notch area is connected electrically to achieve connection to the bonding area of the touch screen, wherein when an area of a remaining second sensing electrode of the second conductive line intercepted by the U-shaped notch area is smaller than half of an area of a complete second sensing electrode, the remaining second sensing electrode is used as a dummy sensing electrode and disconnected from the complete second sensing electrode in a same extending direction.

2. The touch screen according to claim 1, wherein each of the first conductive lines intercepted by the U-shaped notch area is connected by a connecting line, and the connecting line is disposed along an edge of the U-shaped notch area;
   wherein a first end of the connecting line is connected to a first sensing electrode on one side of the U-shaped notch area, and a second end of the connecting line is connected to a first sensing electrode in a same extending direction on an other side of the U-shaped notch area.

3. The touch screen according to claim 2, wherein a portion of the first conductive line intercepted by the U-shaped notch area is connected to the bonding region by at least one second type trace; and one end of each second type trace is connected to an outermost first sensing electrode of the intercepted portion of the first conductive line, and an other end of each second type trace extends to the bonding area.

4. The touch screen according to claim 1, wherein the first sensing electrodes and the second sensing electrodes are offset from each other in a top view, and the connecting strip and the connecting bridge overlap each other.

5. The touch screen according to claim 4, wherein the first sensing electrodes and the second sensing electrodes are in a rhombus shape, and a side of each first sensing electrode and a side of each second sensing electrode are parallel to each other.

6. The touch screen according to claim 5, wherein an insulating layer is disposed between the connecting strip and the connecting bridge; the connecting line for connecting the first conductive line is electrically insulated from the second sensing electrodes.

7. The touch screen according to claim 6, wherein the first sensing electrodes are one of transmitting electrodes and receiving electrodes, and the second sensing electrodes are an other one of the transmitting electrodes and the receiving electrodes.

8. A mobile terminal, at least comprising a touch screen, wherein the touch screen comprises a touch area, wherein the touch area is provided with a plurality of first conductive lines extending along a first direction and a plurality of second conductive lines extending along a second direction, and the second conductive line is insulated from and overlapped with the first conductive line, and each of the first conductive lines comprises a plurality of first sensing electrodes arranged at intervals and a connecting strip connecting two adjacent first sensing electrodes, and each of the second conductive lines comprises a plurality of second sensing electrodes arranged at intervals and a connecting bridge connecting two adjacent second sensing electrodes in a cross-bridge manner, wherein each of the first conductive lines and each of the second conductive lines extend to a bonding area of the touch screen through first type traces;
   a U-shaped notch area is disposed in the touch area, and the U-shaped notch area intercepts at least one first conductive line or/and at least one second conductive line;
   the first conductive line intercepted by and located at two sides of the U-shaped notch area is connected electrically to achieve connection to the bonding area of the touch screen, wherein when an area of a remaining second sensing electrode of the second conductive line intercepted by the U-shaped notch area is smaller than half of an area of a complete second sensing electrode, the remaining second sensing electrode is used as a dummy sensing electrode and disconnected from the complete second sensing electrode in a same extending direction.

9. The mobile terminal according to claim 8, wherein each of the first conductive lines intercepted by the U-shaped notch area is connected by a connecting line, and the connecting line is disposed along an edge of the U-shaped notch area;
   wherein a first end of the connecting line is connected to a first sensing electrode on one side of the U-shaped notch area, and a second end of the connecting line is connected to a first sensing electrode in a same extending direction on an other side of the U-shaped notch area.

10. The mobile terminal according to claim 9, wherein a portion of the first conductive line intercepted by the U-shaped notch area is connected to the bonding region by at least one second type trace; and one end of each second type trace is connected to an outermost first sensing electrode of the intercepted portion of the first conductive line, and an other end of each second type trace extends to the bonding area.

11. The mobile terminal according to claim 8, wherein the first sensing electrodes and the second sensing electrodes are offset from each other in a top view, and the connecting strip and the connecting bridge overlap each other.

12. The mobile terminal according to claim 11, wherein the first sensing electrodes and the second sensing electrodes are in a rhombus shape, and a side of each first sensing electrode and a side of each second sensing electrode are parallel to each other.

13. The mobile terminal according to claim 12, wherein an insulating layer is disposed between the connecting strip and the connecting bridge; the connecting line for connecting the first conductive line is electrically insulated from the second sensing electrodes.

14. The mobile terminal according to claim 13, wherein the first sensing electrodes are one of transmitting electrode and receiving electrodes, and the second sensing electrodes an other one of the transmitting electrodes and the receiving electrodes.

* * * * *